(12) United States Patent
Shultz et al.

(10) Patent No.: US 7,806,803 B2
(45) Date of Patent: Oct. 5, 2010

(54) METHOD AND SYSTEM FOR CONTROLLING TRANSMISSION TEMPERATURE

(75) Inventors: Jeffrey E Shultz, Zionsville, IN (US); Mark A. Rushing, Martinsville, IN (US); Vickie M. Rushing, legal representative, Martinsville, IN (US); John P. Kresse, Martinsville, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 305 days.

(21) Appl. No.: 12/106,547

(22) Filed: Apr. 21, 2008

(65) Prior Publication Data

US 2008/0312034 A1    Dec. 18, 2008

Related U.S. Application Data

(60) Provisional application No. 60/915,100, filed on Apr. 30, 2007.

(51) Int. Cl.
*B60W 10/00*    (2006.01)
(52) U.S. Cl. ...................................................... 477/76
(58) Field of Classification Search ........................ None
See application file for complete search history.

(56) References Cited

U.S. PATENT DOCUMENTS

| | | | | |
|---|---|---|---|---|
| 4,449,618 | A * | 5/1984 | Suga et al. | 192/3.31 |
| 5,050,717 | A * | 9/1991 | Shibayama | 477/64 |
| 5,601,511 | A |  2/1997 | Michioka | |
| 5,643,136 | A * | 7/1997 | Kono et al. | 477/169 |
| 5,954,618 | A * | 9/1999 | Mikami et al. | 477/174 |
| 6,019,703 | A * | 2/2000 | Black et al. | 477/168 |
| 6,146,309 | A * | 11/2000 | Nishino et al. | 477/98 |
| 6,537,178 | B1 * | 3/2003 | Takizawa et al. | 477/76 |
| 7,258,648 | B2 * | 8/2007 | Smith et al. | 477/98 |

\* cited by examiner

*Primary Examiner*—Dirk Wright

(57) ABSTRACT

A method for controlling a transmission in a motor vehicle includes determining a temperature of a fluid in the transmission, determining whether the torque converter lockup clutch is applied, and determining an engine torque of the motor vehicle. Then, the torque converter lockup clutch is applied and the transmission is prohibited from up-shifting if the temperature of the fluid exceeds a threshold, the torque converter lockup clutch is not applied, and the engine torque exceeds a second threshold. Next, a tractive effort of the motor vehicle is determined and the torque converter lockup clutch is deactivated when the temperature of the fluid is less than a third threshold, the tractive effort is less than a fourth threshold, or the engine torque is less than the second threshold.

20 Claims, 3 Drawing Sheets

METHOD AND SYSTEM FOR CONTROLLING TRANSMISSION TEMPERATURE

CROSS-REFERENCE TO RELATED APPLICATIONS

Figure 1:
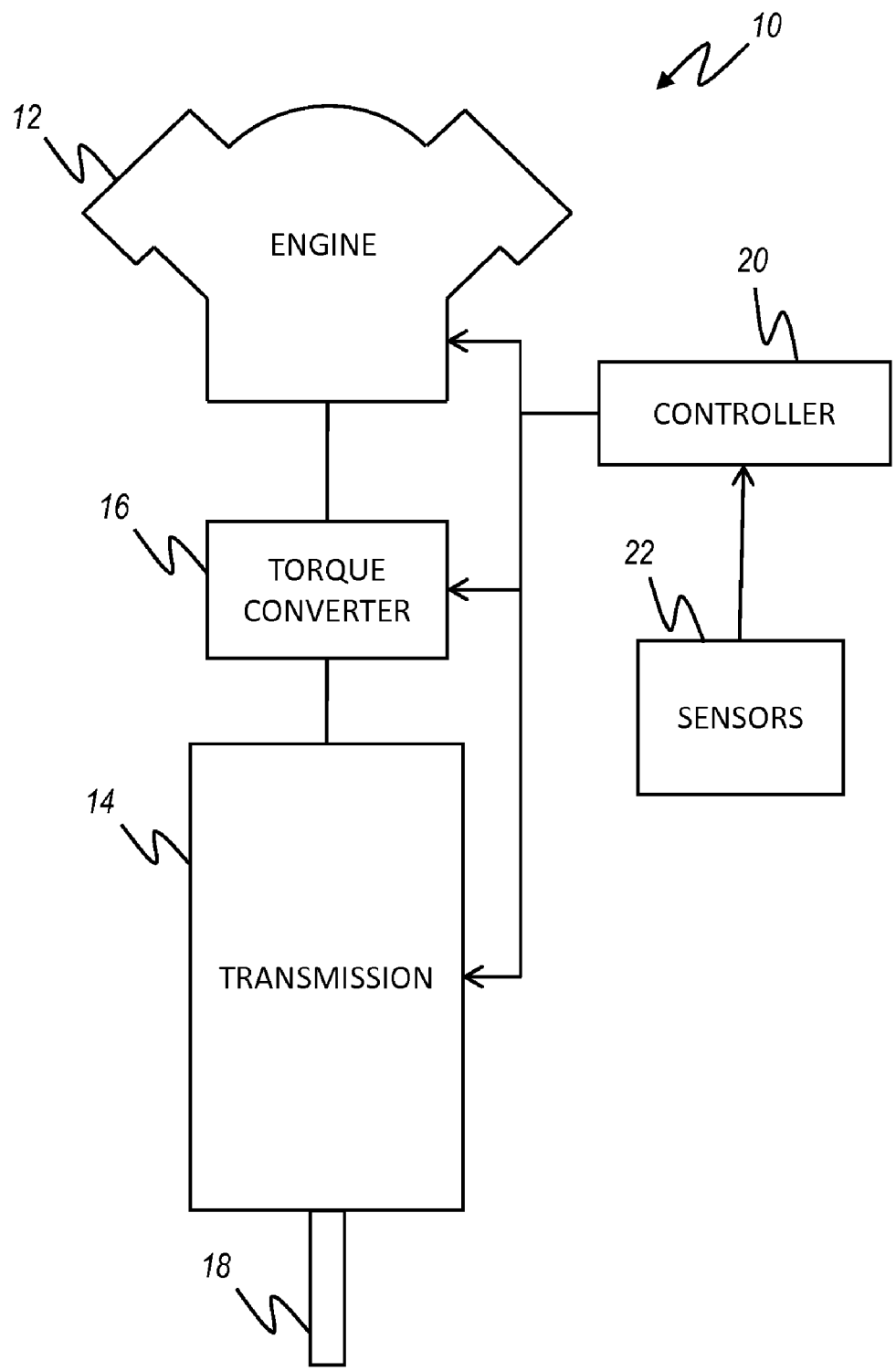

This application claims the benefit of U.S. Provisional Application No. 60/915,100 filed on Apr. 30, 2007. The disclosure of the above application is incorporated herein by reference.

FIELD

The present disclosure relates to transmissions, and more particularly to a method and system for controlling transmission temperature.

BACKGROUND

The statements in this section merely provide background information related to the present disclosure and may or may not constitute prior art.

The operating temperature of a typical automatic transmission in a motor vehicle is affected by various factors including, but not limited to, the operating loads and conditions placed on the transmission as well as environmental conditions. For example, an automatic transmission having a torque converter operating in converter mode (i.e., torque transfer occurs through the transmission fluid in the torque converter) increases the temperature of the transmission fluid. Additionally, operating under heavy acceleration or steep grades can also increase the temperature of the transmission.

Typically, a transmission heat exchanger is used to cool the transmission by transferring the transmission fluid heat to an engine coolant system. Therefore, the transmission fluid temperature is affected by the engine coolant temperature, the engine cooling system's volume, and the engine cooling system's ability to reduce additional transmission heat load. While heat exchangers are effective, there is room in the art for a method of controlling a transmission in order to reduce the temperature of the transmission fluid beyond the capabilities of the transmission heat exchanger and engine coolant system without requiring additional components.

SUMMARY

The present invention provides a method for controlling a transmission in a motor vehicle.

In one aspect of the present invention, the method includes determining a temperature of a fluid in the transmission, determining whether the torque converter lockup clutch is applied, and determining an engine torque of the motor vehicle. Then, the torque converter lockup clutch is applied and the transmission is prohibited from up-shifting if the temperature of the fluid exceeds a threshold, the torque converter lockup clutch is not applied, and the engine torque exceeds a second threshold. Next, a tractive effort of the motor vehicle is determined and the torque converter lockup clutch is deactivated when the temperature of the fluid is less than a third threshold, the tractive effort is less than a fourth threshold, or the engine torque is less than the second threshold.

In another aspect of the present invention, the method includes the steps of determining whether the motor vehicle is within a gear range greater than a first gear range, decelerating the motor vehicle if the gear range is greater than the first gear range, and ending deceleration of the motor vehicle when the gear range of the motor vehicle changes to a lower gear range.

In yet another aspect of the present invention, the method includes downshifting the transmission to a gear ratio corresponding to the lower gear range when the gear range of the motor vehicle changes to the lower gear range.

In yet another aspect of the present invention, decelerating the motor vehicle includes decelerating the motor vehicle using engine torque limiting.

In yet another aspect of the present invention, the first gear range corresponds to a first gear ratio.

In yet another aspect of the present invention, the first threshold is equal to the third threshold.

In yet another aspect of the present invention, tractive effort is calculated from the engine torque and current coolant temperature of the engine, from the torque converter torque ratio, and from the current gear ratio of the transmission.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2A:
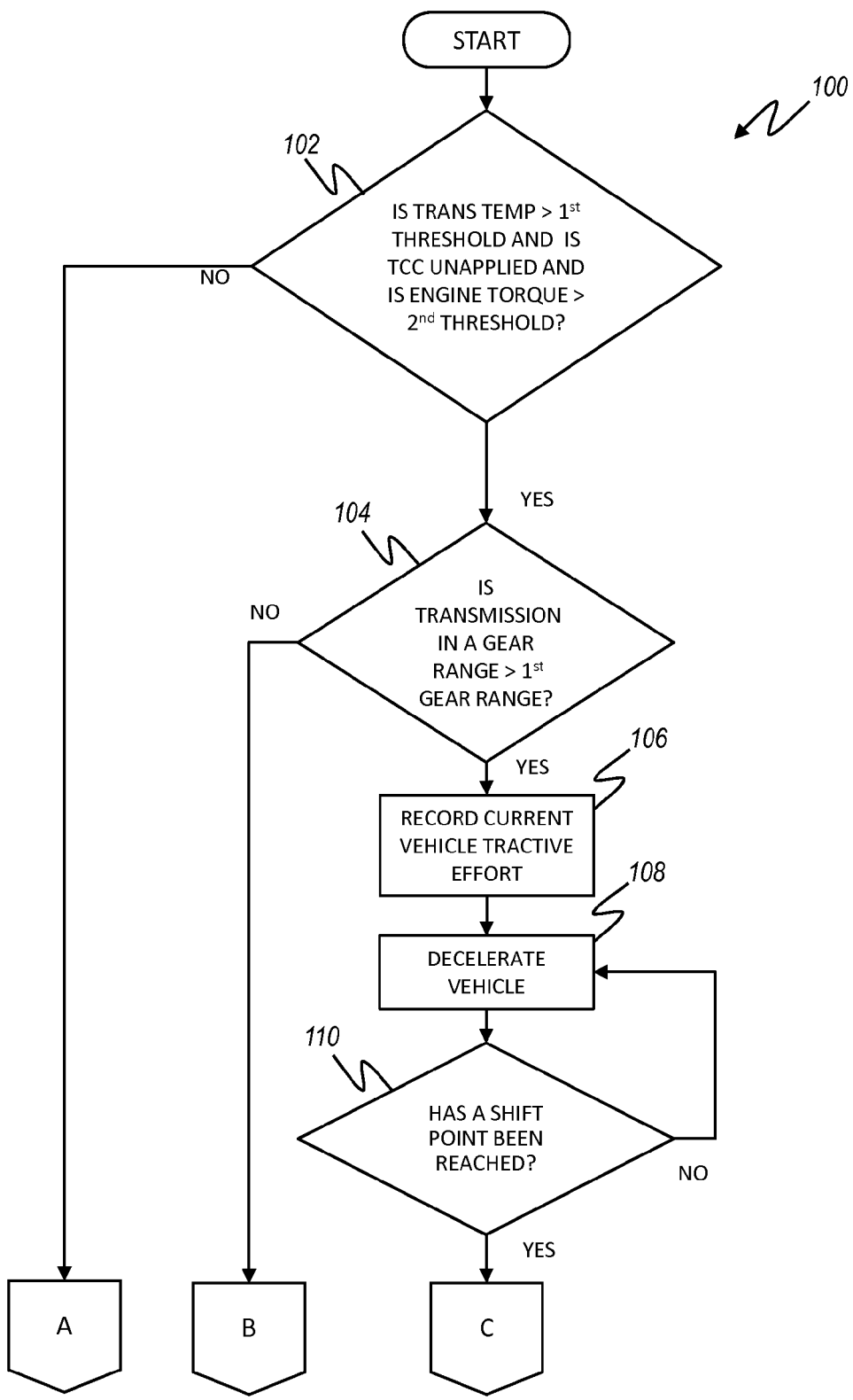
Figure 2B:
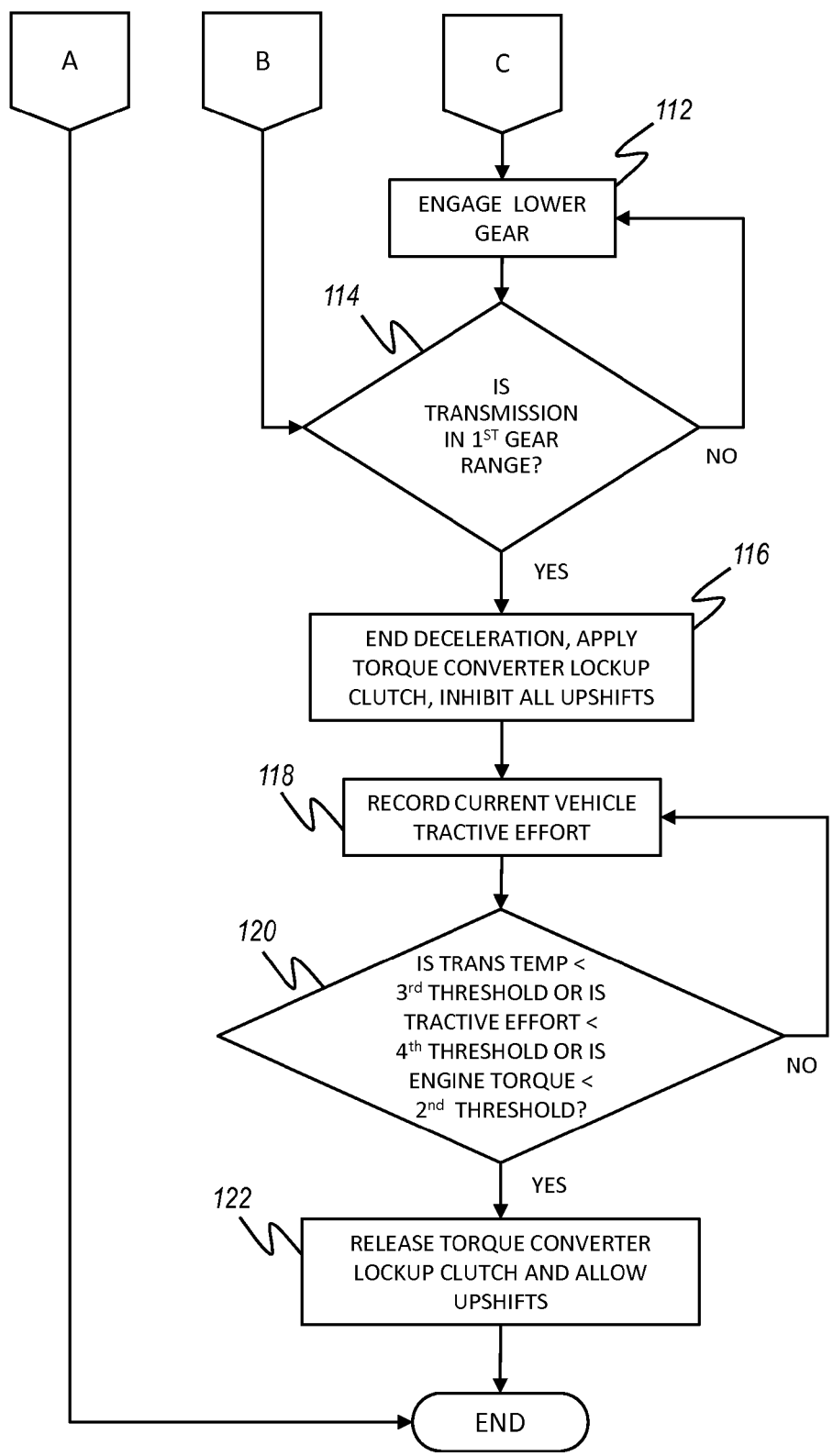

FIG. 1 is a schematic diagram of a exemplary powertrain employing a transmission control method of the present invention; and FIGS. 2A and 2B is a flow chart illustrating the transmission control method of the present invention.

DETAILED DESCRIPTION

The following description is merely exemplary in nature and is not intended to limit the present disclosure, application, or uses.

With reference to FIG. 1 an exemplary powertrain is generally indicated by reference number 10. The powertrain 10 is preferably employed in a motor vehicle (not shown). The powertrain 10 includes an internal combustion engine 12 that generates a driving force or engine torque. It should be appreciated that the engine 12 may be a hybrid combustion/electric engine or any other type of engine without departing from the scope of the present invention.

The powertrain 10 further includes an automatic transmission 14. The automatic transmission 14 is operable to provide a reverse, park, and neutral gears as well as a plurality of forward and reverse gear ratios. The transmission 14 is operable to up-shift through the gear ratios going from a higher gear ratio to a lower gear ratio as well as down-shift through the gear ratios going from a lower gear ratio to a higher gear ratio. Hereinafter, each forward gear ratio is conventionally labeled, from highest to lowest gear ratio, as $1^{st}$ gear, $2^{nd}$ gear, $3^{rd}$ gear, etc. Additionally, each gear ratio includes a corresponding gear range. The gear range is the range of speed of the motor vehicle for which the given gear is preferably selected. The gear ranges are labeled in a similar manner to the gear ratio, for example, $1^{st}$ gear range, $2^{nd}$ gear range, $3^{rd}$ gear range, etc.

A torque converter 16 is connected between the engine 12 and the transmission 14. The torque converter 16 is operable to transfer the driving force or engine torque from the engine 12 to the transmission 14 and on to an output shaft 18. The torque converter 16 transfers engine torque using either a fluid coupling or a direct mechanical coupling using a torque converter lockup clutch, also known as a TCC. During fluid coupling or converter mode, the engine torque is transferred through a transmission fluid in the torque converter 16. While engine torque is multiplied through the torque converter 16 when in converter mode, the temperature of the transmission fluid may increase. When the torque converter clutch is applied, a direct mechanical connection is created between the engine 12 and the transmission 14 and the transmission fluid temperature may decrease.

The powertrain 10 further includes a controller 20 in electronic communication with the engine 12, the transmission 14, and the torque converter 16. The controller 20 may be an engine controller or transmission controller, or any other electronic device having a preprogrammed digital computer or processor, control logic, memory used to store data, and at least one I/O section. The control logic includes a plurality of logic routines for monitoring, manipulating, and generating data as well as controlling the components of the powertrain 10 through a hydraulic control system (not shown). A plurality of sensors 22 are in electronic communication with the controller 20. The sensors 22 may include a transmission fluid temperature sensor, engine output sensor, and any other number of devices operable to sense the current conditions of the motor vehicle.

Turning now to FIGS. 2A and 2B and with continued reference to FIG. 1, a transmission control method is illustrated and generally indicated by reference number 100. The steps of the method 100 correspond to control logic used by the controller 20 during the method 100. The method 100 begins at step 102 where the controller 20 determines whether a temperature of the transmission fluid exceeds a first threshold, whether the torque converter clutch is currently being applied, and whether engine torque exceeds a second threshold. The transmission fluid temperature and engine torque are determined based on input from the sensors 22 and from the current operating settings of the powertrain 10. The first threshold and the second threshold are predefined calibrated values. The first threshold approximately corresponds to an undesirable or high transmission fluid temperature and the second threshold corresponds to relatively high current operating engine torque. If the transmission fluid temperature is less than the first threshold and/or the engine torque is less than the second threshold, then the method 100 ends.

If the transmission fluid temperature is greater than the first threshold and the engine torque is greater than the second threshold, then the method 100 proceeds to step 104. At step 104, the controller 20 determines whether the transmission 14 is currently operating in a gear range greater than the $1^{st}$ gear range, such as, for example, the $2^{nd}$ gear range. It should be appreciated that the method 100 may be employed during any gear range, such as a $3^{rd}$, $4^{th}$, $5^{th}$, or greater gear range. Operation in a gear range higher than the $1^{st}$ gear range provides an opportunity for the method 100 to employ a different gear ratio that can be used to help offset the loss in torque multiplication that occurs when the torque converter lockup clutch is applied, as will be described in greater detail below. If the transmission 14 is not operating in a gear range greater than the $1^{st}$ gear range, the method 100 proceeds to step 116.

If the transmission 14 is operating in a gear range greater than the $1^{st}$ gear range, the method 100 proceeds to step 106 where the controller 20 records the current vehicle tractive effort. The vehicle tractive effort is the force being exerted by the motor vehicle under the current operating conditions. Accordingly, vehicle tractive effort is calculated from the engine torque and current coolant temperature of the engine 12, from the torque converter torque ratio, and from the current gear ratio of the transmission 14 using internal transmission control calculations.

At step 108 the motor vehicle is then decelerated preferably using engine torque limiting. The rate of deceleration is a pre-defined calibrated rate.

The controller 20 then determines whether a down shift point has been achieved at step 110. The down shift point corresponds to the motor vehicle speed where a lower gear range and an upper gear range meet, and accordingly is the point where the transmission 14 should downshift from the higher gear to the lower gear. For example, the 2-1 shift point corresponds to the motor vehicle speed where the $1^{st}$ gear range meets the $2^{nd}$ gear range and accordingly the transmission 14 should downshift from $2^{nd}$ gear to $1^{st}$ gear. If the down shift point has not been reached, then step 108 is repeated and the motor vehicle continues to decelerate.

If the down shift point has been achieved, the controller 20 then commands the transmission 14 to select the lower gear ratio by downshifting to the lower gear at step 112. The method 100 then checks to determine whether the transmission 14 has downshifted at step 114. If the lower gear ratio has not been achieved, step 112 is repeated.

Once the lower gear ratio has been achieved, the method proceeds to step 116 where the controller 20 terminates the deceleration of the motor vehicle, and the torque converter lockup clutch within the torque converter 16 is applied and any up-shifting is prohibited. As noted above, engaging or applying the torque converter lockup clutch creates a direct mechanical connection between the engine 12 and the transmission 14. Accordingly, the transmission fluid within the torque converter 16 will not be heated during converter mode and the transmission fluid will cool. At step 118 the controller 20 then records the current tractive effort of the motor vehicle.

At step 120, the controller 20 determines whether the transmission fluid temperature is less than a third threshold, whether the current tractive effort is less than a fourth threshold, or whether the engine torque is less than the second threshold. The third threshold may be equal to the first threshold or have a different pre-defined value corresponding to a desired transmission fluid temperature. The fourth threshold is a certain amount below either of the tractive effort values recorded in steps 106 and 118. If the transmission fluid temperature is greater than the third threshold, the current tractive effort is greater than the fourth threshold, and the engine torque is greater than the second threshold, then step 118 is repeated and the current tractive effort recorded.

If the transmission fluid temperature is less than the third threshold, the current tractive effort is less than the fourth threshold (thereby indicating that the motor vehicle should be able to accelerate to a speed to reach the higher gear range with the TCC engaged), or the engine torque is less than the second threshold, then the method 100 proceeds to step 122. At step 122, the torque converter lockup clutch is released or unengaged and the up-shifting prohibition is removed by the controller 20 and the powertrain 10 continues to operate as normally.

The description of the invention is merely exemplary in nature and variations that do not depart from the gist of the invention are intended to be within the scope of the invention. Such variations are not to be regarded as a departure from the spirit and scope of the invention.

We claim the following:

1. A method for cooling a fluid in a transmission, the method comprising the steps of:
   determining a first temperature of the fluid in the transmission;
   determining whether a torque converter lockup clutch is applied;
   determining a first engine torque;
   calculating a first tractive effort of the motor vehicle;
   engaging the torque converter lockup clutch and prohibiting the transmission from up-shifting if the temperature of the fluid exceeds a first temperature threshold, the torque converter lockup clutch is not applied, and the engine torque exceeds an engine torque threshold;
   determining a second temperature of the fluid in the transmission;
   determining a second engine torque;
   calculating a second tractive effort of the motor vehicle; and
   disengaging the torque converter lockup clutch if the second temperature of the fluid is less than a second temperature threshold, the second tractive effort is less than a tractive effort threshold, or the second engine torque is less than the engine torque threshold.

2. The method of claim 1 further comprising the steps of:
   determining a current gear range of the transmission;
   decelerating the motor vehicle if the current gear range is greater than a first gear range of the transmission, wherein the first gear range corresponds to the lowest forward gear ratio provided by the transmission; and
   terminating deceleration of the motor vehicle when the current gear range of the motor vehicle changes to a lower gear range.

3. The method of claim 2 further comprising the steps of downshifting the transmission to a gear ratio corresponding to the lower gear range when the current gear range of the motor vehicle changes to the lower gear range.

4. The method of claim 3 wherein the lower gear range is the first gear range.

5. The method of claim 3 wherein decelerating the motor vehicle includes decelerating the motor vehicle using the engine torque to limit a speed of the motor vehicle.

6. The method of claim 1 wherein the first temperature threshold is equal to the second temperature threshold.

7. The method of claim 1 wherein the first and second tractive efforts are calculated from the engine torque, from a torque converter torque ratio, and from a gear ratio of the transmission.

8. The method of claim 1 wherein the tractive effort threshold is a value lower than the first tractive effort.

9. A method for cooling a fluid in a transmission, the method comprising the steps of:
   determining a first temperature of the fluid in the transmission;
   determining whether a torque converter lockup clutch is applied;
   determining a first engine torque;
   calculating a first tractive effort of the motor vehicle;
   determining a current gear range of the transmission;
   decelerating the motor vehicle if the current gear range is greater than a first gear range of the transmission, wherein the first gear range corresponds to the lowest forward gear ratio provided by the transmission, and if the temperature of the fluid exceeds a first temperature threshold, the torque converter lockup clutch is not applied, and the engine torque exceeds an engine torque threshold;
   terminating deceleration of the motor vehicle when the current gear range of the motor vehicle changes to a lower gear range;
   engaging the torque converter lockup clutch and prohibiting the transmission from up-shifting if the temperature of the fluid exceeds the first temperature threshold, the torque converter lockup clutch is not applied, and the engine torque exceeds the engine torque threshold;
   determining a second temperature of the fluid in the transmission;
   determining a second engine torque;
   calculating a second tractive effort of the motor vehicle; and
   disengaging the torque converter lockup clutch if the second temperature of the fluid is less than a second temperature threshold, the second tractive effort is less than a tractive effort threshold, or the second engine torque is less than the engine torque threshold.

10. The method of claim 9 further comprising the steps of downshifting the transmission to a gear ratio corresponding to the lower gear range when the current gear range of the motor vehicle changes to the lower gear range.

11. The method of claim 10 wherein the lower gear range is the first gear range.

12. The method of claim 9 wherein decelerating the motor vehicle includes decelerating the motor vehicle using the engine torque to limit a speed of the motor vehicle.

13. The method of claim 9 wherein the first temperature threshold is equal to the second temperature threshold.

14. The method of claim 9 wherein the first and second tractive efforts are calculated from the engine torque, from a torque converter torque ratio, and from a gear ratio of the transmission.

15. The method of claim 9 wherein the tractive effort threshold is a value lower than the first tractive effort.

16. A system for cooling a fluid in a powertrain, the system comprising:
   an engine operable to provide engine torque;
   a transmission operable to provide a plurality of forward gear ratios;
   a torque converter having a lockup clutch for directly connecting the engine to the transmission; and
   a controller in communication with the engine, the transmission, and the lockup clutch, the controller having memory for storing control logic, the control logic including a first control logic for determining a first temperature of the fluid in the transmission, a second control logic for determining whether the lockup clutch is applied, a third control logic for determining a first engine torque, a fourth control logic for calculating a first tractive effort of the motor vehicle, a fifth control logic for engaging the lockup clutch and prohibiting the transmission from up-shifting if the temperature of the fluid exceeds a first temperature threshold, the torque converter lockup clutch is not applied, and the engine torque exceeds an engine torque threshold, a sixth control logic for determining a second temperature of the fluid in the transmission, a seventh control logic for determining a second engine torque, an eighth control logic for calculating a second tractive effort of the motor vehicle, and a ninth control logic for disengaging the torque converter lockup clutch if the second temperature of the fluid is less than a second temperature threshold, the second tractive effort is less than a tractive effort threshold, or the second engine torque is less than the engine torque threshold.

17. The system of claim 16 wherein the controller includes a tenth control logic for determining a current gear range of the transmission, an eleventh control logic for decelerating the motor vehicle if the current gear range is greater than a first gear range of the transmission, wherein the first gear range corresponds to the lowest forward gear ratio provided by the transmission, and a twelfth control logic for terminating deceleration of the motor vehicle when the current gear range of the motor vehicle changes to a lower gear range.

18. The system of claim 16 wherein the first temperature threshold is equal to the second temperature threshold.

19. The system of claim 16 wherein the first and second tractive efforts are calculated from the engine torque, from a torque converter torque ratio, and from a gear ratio of the transmission.

20. The system of claim 16 wherein the tractive effort threshold is a value lower than the first tractive effort.

* * * * *